June 6, 1933. C. B. CLARK 1,912,621
METHOD AND MEANS FOR ROASTING SULPHIDE ORES
Filed Oct. 2, 1929 2 Sheets-Sheet 2
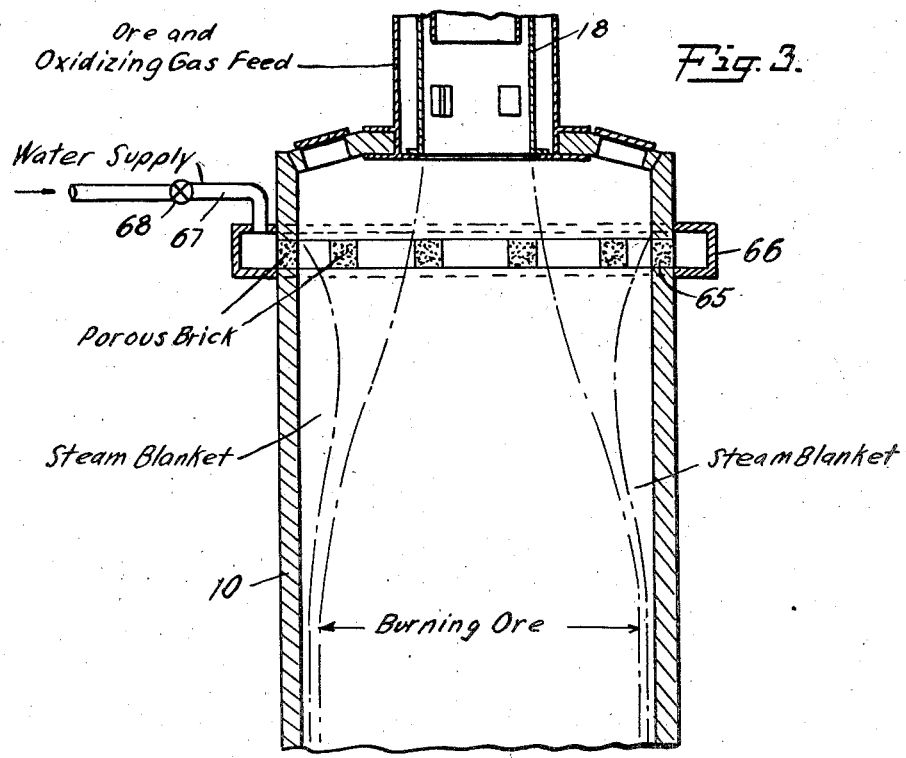
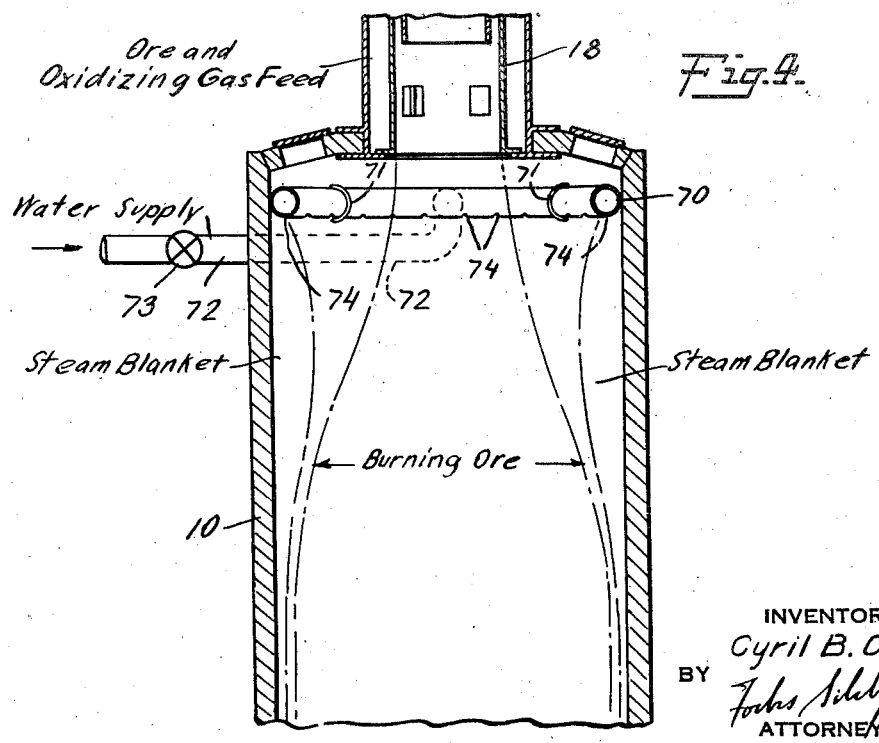
INVENTOR
Cyril B. Clark
BY
ATTORNEY Patented June 6, 1933

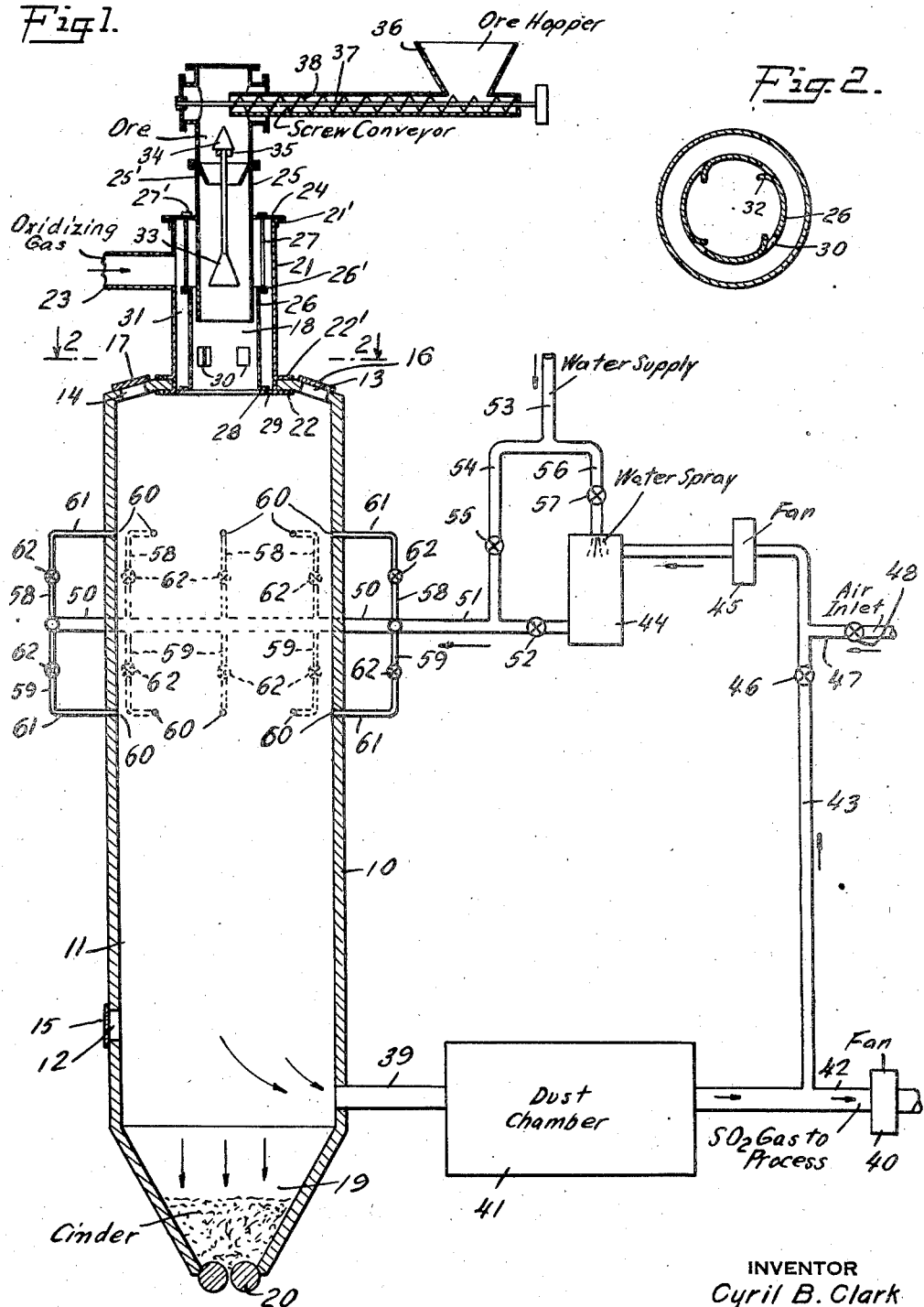

1,912,621

UNITED STATES PATENT OFFICE

CYRIL BACKUS CLARK, OF SCARSDALE, NEW YORK, ASSIGNOR TO GENERAL CHEMICAL COMPANY, OF NEW YORK, N. Y., A CORPORATION OF NEW YORK

METHOD AND MEANS FOR ROASTING SULPHIDE ORES

Application filed October 2, 1929. Serial No. 396,675.

The invention relates to the roasting of finely divided sulphide ores, flotation concentrates and the like, and to methods for burning sulphide ores in air so as to thoroughly desulphurize the ores and to produce sulphur dioxide containing gas for use in the manufacture of sulphuric acid. More specifically, the invention relates to methods and means for controlling the temperature of reaction chambers in general, and especially sulphide ore burners in order that the capacity of the burner and the strength of the gaseous products may be increased.

The present practice in roasting sulphide ores generally involves the use of mechanically operated multiple hearth furnaces of familiar construction in which the ore is gradually worked over a series of superposed hearths by rabbles carried by revolving arms. On account of the expense of operating and maintaining such equipment, and the increasing available quantities of finely divided sulphide ore from flotation concentration processes, this more customary process of roasting is being displaced gradually by methods of roasting sulphide fines while dispersed or suspended in an oxidizing gas such as air, for example where the ore is showered through a burner and is contacted with currents of air introduced into the combustion chamber. However, in carrying the latter methods into effect, certain operating difficulties have been encountered which at times offset to a large extent the advantages of the process.

When a sulphide ore is burned in air the reaction is exothermic, and more heat is generated than is necessary to carry out the reaction under preferred operating conditions. A large part of the heat leaves the burner in the gas produced by the reaction, a considerable amount is lost by radiation, and a small part of the excess heat passes out of the burner in the cinder. An increase in the $SO_2$ content of the gas, or the quantity of ore burned per unit of time, materially increases the temperature of the burner, as heat losses in the gas and by radiation are proportionally less. Consequently, when an attempt is made to increase the capacity of a given furnace or burner, the temperature tends to rise to such an extent as to exceed the fusion point of the ore or cinder, with the resulting formation of clinker or "scar" on the walls of the combustion chamber. When the temperature of the reaction becomes excessive, wall accretions accumulate rapidly, and necessitate periodic interruption of the roasting process for the purpose of cleaning down the interior walls of the burner. Aside from the interruption of the roasting operation, the wear and tear on the walls of the chamber, the time necessary to break up large lumps so as to permit their passage through the cinder discharge mechanism, and the high sulphur content of the accretions are material disadvantages.

It is therefore the object of this invention to provide a method for roasting sulphide ores in which the tmperature of the reaction and of the reaction chamber may be controlled. I have found that this may be accomplished by introducing water into the combustion chamber, either as vapor in air or gas, as a mist or spray carried mechanically by air or gas, or as steam, as fully described hereinafter.

A further object of the invention is the provision of suitable apparatus for carrying the foregoing processes into effect.

By roasting sulphide ores as outlined above, and as described more in detail hereinafter, the temperature of the reaction may be accurately controlled, thereby permitting a substantial increase in the daily capacity of a given furnace, a raising of the $SO_2$ content of the gas produced, and by reason of the maintenance of controlled operating temperatures inhibiting the formation of clinkers on the walls of the furnace and the attendant difficulties arising therefrom.

I will now describe specific embodiments of the invention in connection with suitable apparatus illustrated in the accompanying drawings in which:

Figure 1 is an elevation partly in section of one form of apparatus in which the present invention may be carried out;

Fig. 2 is a horizontal section on the line 2—2 of Fig. 1;

Fig. 3 is a sectional elevation of a modified burner construction, and

Fig. 4 is a sectional elevation of another modified form of burner.

Referring to Fig. 1, the reference numeral 10 indicates, generally, a vertical shaft burner of circular cross-section and of any desired horizontal and vertical dimensions, providing in the interior thereof a cylindrical combustion chamber 11. The general features of the construction of the shaft burner are immaterial to this invention, and may be of any approved construction. The burner shaft may be provided at any suitable number of points with work-holes 12, 13 and 14, each of which is closed by externally operated doors 15, 16 and 17.

A mixture of finely divided sulphide ore and oxidizing gas is fed into the upper end of the combustion chamber 11 by means of a feeding device which is indicated generally at 18. The iron oxide cinder is withdrawn from the burner through the hopper-shaped pit 19 and the cooperating rolls 20 which may be rotated by mechanism not shown.

The feeding mechanism indicated herein is shown only by way of example. Any arrangement which will inject into the upper end of the combustion chamber finely divided ore and oxidizing gas may be provided. The vertically disposed cylindrical casing 21 carries on its lower end two circular flanges 22 and 22' which cooperate with the crown of the burner to form a gas-tight closure between the burner proper and the feeding mechanism. The cylindrical casing 21 has connected thereto a conduit 23 which in turn is connected to any suitable source of supply of oxidizing gas, such as air or oxygen. A flange 21' secured to the upper end of the cylindrical casing 21 forms a seat for the annular flange 24 which is fixed in any suitable manner to a vertically disposed ore conduit 25 of circular cross-section.

A cylindrical gas distributing sleeve 26, having an outwardly projecting top flange 26', is carried on the headed ends of a series of tie bolts 27 extending upwardly through the flange 26'. Rods 27 project through suitable holes bored in flange 24, and are retained by the latter by means of nuts 27' on the threaded ends of rods 27. On its lower end, the gas distributing sleeve 26 is provided with an outwardly turned circular flange 28 which rests upon the inwardly extending flange 29 on the lower end of the casing 21. The gas distributing sleeve is provided with a series of orifices 30 which permit the admission of air into the interior of the gas distributing sleeve 26 from the annular gas chamber 31. The openings 30 have associated therewith a series of baffles 32 which serve to give a whirling motion to the air entering the distributing sleeve from the chamber 31.

The diameter of conduit 25 is somewhat less than that of the distributing sleeve 26 so that an annular air passage is formed between the lower end of conduit 25 and the upper end of the distributing sleeve 26. Ore dispersing cones 33 and 34 are supported in the center of conduit 25 by any suitable means such as bracket 35. A funnel 25' is fixed in the interior of the conduit 25 at a point below cone 34 and above cone 33. Finely divided ore is fed into the conduit 25 from the ore hopper 36 by means of a screw conveyor 37 rotatably mounted in the horizontally disposed conduit 38.

The gaseous products from the combustion of the ore are withdrawn from the lower end of the burner shaft through a conduit 39, by means of a fan or blower 40. The furnace gases pass through a dust chamber 41, and thence through conduit 42 to be utilized in the sulphuric acid or other process.

A pipe 43 is connected at one end to the conduit 42 and at its other end to a water spray device 44. A fan 45 is interposed between the water spray 44 and the main gas conduit 42. The passage of gas through pipe 43 is regulated by fan 45 and a valve 46. For purposes to be hereinafter described, pipe 43 is provided with a connection to a source of air supply through a pipe 47 and a valve 48.

A manifold 50 is provided encircling the burner 10. The manifold 50 is connected to the water spray chamber 44 through a pipe 51 and a valve 52. The manifold is also connected to a source of water supply 53 through a pipe 54 and a valve 55. The water supply for the spray chamber 44 is obtained through a pipe 56 controlled by a valve 57.

The manifold 50 has connected thereto a series of upwardly and downwardly extending pipes 58 and 59. Pipes 58 and 59 are connected to atomizing nozzles 60 by short horizontally disposed pipe sections 61. The passage of gases and vapors through pipes 58 and 59 is controlled by suitable valves 62. Nozzles 60 are set into the wall of the burner 10 so that their open ends extend just to the surface of the inner wall of the combustion chamber 11. The nozzles are arranged vertically near the top of the burner shaft and around the hottest part of the combustion chamber. The number of nozzles included in any one burner unit may vary in accordance with operating requirements. It will be understood, of course, that if a greater or less number of nozzles is required, it is only necessary to open or close any valve 62 to throw into or out of operation a corresponding nozzle 60. If a greater number of nozzles is necessary than that shown in the drawings, it is obvious that they may be set into the burner wall and connected to the manifold 50 in the manner already described.

The process, in connection with the apparatus illustrated in Fig. 1, is carried out substantially as follows: The burner 10 is preheated, by any suitable means such as an oil burner inserted in work-hole 12, until the temperature of the combustion chamber 11 is raised substantially above the ignition point of whatever sulphide ore may be used. This temperature in general may be about 850° C. During preheating, closures 16 and 17 may be removed from the work-holes 13 and 14 to permit the escape of the preheating gases.

The process will be described using finely divided iron pyrites or flotation concentrates as an example, but it is obvious that the invention is not confined to such material but may be applied to other sulphide ores, such as copper pyrites, zinc blend, and flotation concentrates which are characterized by an action similar to that of iron sulphide.

Iron sulphide ore, ground to pass about 60 mesh and preferably dried until the moisture content is not over approximately .3%, is fed into the ore hopper 36 by any suitable grinding and elevating mechanism. On the operation of the screw conveyer 37, the ore is carried along the conduit 38, and is fed at a constant rate into the upper end of conduit 25. The ore falling through conduit 25 is mixed and dispersed into a cone-shaped mass by contacting alternately the cone 34, funnel 25' and the lower cone 33. A supply of oxidizing gas, such as air or oxygen, is injected into casing 21 through conduit 23 in a quantity which, as well known in the art, is to be regulated in accordance with the desired $SO_2$ content of the exist gases of the burner.

Air from the casing 21 enters the gas distributing sleeve 26 through the annular passage between the lower end of the conduit 25 and the upper end of the distributing sleeve 26. The greater part of the gas necessary for supporting the combustion of the ore enters at this point. However, the annular chamber 31 contains oxidizing gas at the same pressure which prevails in the upper end of casing 21. A small quantity of gas from annular chamber 31 enters the interior of the distributing sleeve 26 through the openings 30 and on account of the baffles 32, imparts to the ore falling through the distributing sleeve in a whirling motion. When the mixture of gas and ore enters the upper end of the burner shaft it expands, spreading out and contacting with the interior walls of the combustion chamber 11.

The mixture of iron ore and oxidizing gas burns by self-sustaining combustion as is commonly known, and produces at the lower end of the burner shaft, the cinder consisting largely of $Fe_2O_3$ and gases which contain principally $SO_2$, $N_2$, $O_2$, water vapor and small quantities of $SO_3$.

As is well known, the reaction in chamber 11 is exothermic, and much greater quantities of heat are liberated than is necessary to carry on combustion. As previously discussed, when an attempt is made to increase either the quantity of ore treated per unit of time, or to raise the sulphur dioxide content of the issuing gases, the temperature within the chamber 11 rises rapidly, and if it is allowed to exceed a certain limit, sintering of the ore occurs with resulting scar formation.

According to the present invention, the gases of the reaction are withdrawn from chamber 11 as described through conduit 39 and dust chamber 41. The greater part of the exit gases pass through the conduit 42 to the sulphuric acid process. However, a small portion of the gases and entrained vapors in main 42 are withdrawn therefrom by means of the fan 45 and pipe 43 when valve 46 is open. For the present it will be assumed that valve 48 is closed.

The gas withdrawn from the main 42 is forced into the chamber 44, where on account of the water spray injected therein by proper regulation of valve 57, the gas is cooled to about 70° F. and its moisture content greatly increased. For the time being it will be understood that valve 55 is closed, and that valve 52 is open. On account of the pressure created by fan 45, a mixture of gases and vapors is forced out of spray chamber 44 through pipe 51 into the manifold 50. From the manifold the mixture is directed into the short horizontal pipes 61, and into the nozzles 60. The mixture in manifold 50 contains largely $SO_2$, $O_2$, $N_2$, water as a vapor and entrained particles, and a limited quantity of acid mist formed by the reaction of the small quantities of $SO_3$ in the burner gases and the water in spray chamber 44.

The mixture of gases and vapors in the manifold is injected into the combustion chamber and thus effectively reduces the temperature of the reaction, lowers the temperature of the exit gases of the burner by increasing the moisture content thereof, and prevents fusion of the ore and its consequent adhesion to the walls of the chamber in the form of clinker.

In operation, the condition of the chamber walls may be observed through peep holes in the closures 16 and 17, and the quantity of gases and vapors injected may be regulated according to the conditions noted within the chamber.

A specific example of the operation of the process in the apparatus illustrated in Fig. 1 is as follows: The operation of the furnace is controlled in the usual manner to produce an 11% $SO_2$ gas. About 5% of this gas is withdrawn from the main 42 and cooled by water in the chamber 44 to about 70° F. By introducing approximately .07 lbs. of water as a spray or mist into the gas passing through the spray chamber 44 per pound of ore burned, the temperature of the gas in the burner may be reduced about 211° F. which ordinarily will be found to be sufficient to maintain the furnace temperature below the sintering point of the ore.

According to the apparatus arrangement in Fig. 1, it is also possible to carry out the process without using gases from the main 42. In this instance, valve 46 is closed, and valve 48 is opened. On operation of the fan 45, air at room temperature is drawn in through pipe 47 and mixed with the water spray in chamber 44. The air and entrained water particles then pass through pipe 51 into manifold 50 and are injected into the combustion chamber as described.

Under some conditions of operation, it may also be desirable to inject water alone into the combustion chamber. With conditions requiring such procedure, valves 52 and 57 are closed and valve 55 open. In this arrangement, only water under pressure will be supplied to nozzles 60. Under these circumstances it will be preferable to construct the nozzles 60 so that the water introduced into the combustion chamber will be injected in the form of a fine spray or mist. In this method of operation the spray of water is vaporized to form steam upon its admission into the furnace, thereby exerting a strong cooling effect. Under these conditions, the introduction of about .07 lbs. of water per pound of ore burned to an 11% $SO_2$ gas in the burner, will cool the furnace and the exit gases about 117° F.

In the modification shown in Fig. 3, the burner proper is generally of the same construction as that described in connection with Fig. 1. The feeding means 18 may be of the same type shown in Fig. 1, and the cinder and gas removing means at the lower end of the shaft, not shown in Fig. 3, may also be of the same construction as in Fig. 1.

In the upper end of the furnace wall, arranged a short distance above the zone of combustion, a series of porous bricks 65, for example such as filtros or alundum, is set into and forms an integral part of the furnace wall. A water channel 66 completely encircles the burner in the same horizontal plane as the series of porous bricks 65. The water channel 66 is closed on its upper side as shown and is suitably connected to a water supply as by a pipe 67 and a valve 68. It is obvious that all the bricks in the course need not be porous, depending upon the extent of cooling desired.

In carrying out the process by means of the apparatus illustrated in Fig. 3, channel 66 is kept filled with water either at normal or elevated pressure. The water in channel 66 seeps through the porous bricks and is evaporated on the inner surface thereof forming a blanket of steam between the burning ore and the walls of the combustion chamber. The supply of water to channel 66 and likewise to the interior of the burner is regulated by the pressure in the pipe line 67 which in turn is controlled by valve 68. If a greater supply of steam is necessary in the interior of the shaft, it is only necessary to increase the pressure of the water in channel 66. Under these conditions the introduction of about .07 lbs. of water per pound of ore burned to an 11% $SO_2$ gas in the burner will cool the furnace and the exit gases about 117° F.

In the apparatus illustrated in Fig. 4, a manifold 70 consisting of a circular ring of pipe of substantially circular cross-section is supported in the interior of the burner at its upper end immediately adjacent the vertical walls by any suitable means such as brackets 71. The manifold 70 is connected to a source of water supply through a pipe 72 and a valve 73. The manifold 70 is provided on its lower side with a series of perforations or openings 74 which permit the injection into the combustion chamber of a fine spray of water or steam. The perforations 74 are arranged so as to project a blanket of water vapor or steam against the interior walls of the burner 10.

The process is carried out in the apparatus illustrated in Fig. 4 in substantially the same manner as in connection with the apparatus shown in Fig. 3. In this modification the water is introduced into the upper end of the combustion chamber through the manifold 70 rather than by means of the porous bricks illustrated in Fig. 2. Under these conditions the introduction of about .07 lbs. of water per pound of ore burned to an 11% $SO_2$ gas in the burner will cool the furnace and the exit gases about 117° F.

In the appended claims the term "water" is intended to include weak sulphuric acid or other suitable cooling liquid.

I claim:

1. The improvement in the method of roasting finely divided sulphide ore which comprises dispersing said ore in an oxidizing gas, and burning said dispersion in a roasting chamber while maintaining a layer of water vapor between the walls of said chamber and the burning ore while the latter is in a state conducive to scar formation on said walls whereby the temperature immediately adjacent the walls is reduced and scar formation on said walls is avoided.

2. In a roasting furnace, a combustion chamber, means to feed into said chamber a stream of finely divided ore dispersed in an oxidizing gas, and means including a water channel and porous members associated with the wall of said chamber arranged adjacent the zone of combustion for introducing and maintaining a layer of steam between the walls of the chamber and the burning ore.

In witness whereof, I have hereunto set my hand.

CYRIL BACKUS CLARK.